United States Patent [19]
Chi et al.

[11] B 3,982,194
[45] Sept. 21, 1976

[54] PHASE LOCK LOOP WITH DELAY CIRCUITS FOR RELATIVE DIGITAL DECODING OVER A RANGE OF FREQUENCIES

[75] Inventors: Chao S. Chi, Shresbury; Peter T. McLean, Stow; Norman A. Field, Acton, all of Mass.

[73] Assignee: Digital Equipment Corporation, Maynard, Mass.

[22] Filed: Feb. 18, 1975

[21] Appl. No.: 550,693

[44] Published under the second Trial Voluntary Protest Program on January 20, 1976 as document No. B 550,693.

[52] U.S. Cl. .............................. 328/155; 331/1 A; 331/25
[51] Int. Cl.² ..................... H03B 3/04; H03K 5/18
[58] Field of Search ............. 328/155; 331/1 A, 18, 331/25

[56] References Cited
UNITED STATES PATENTS

| | | | |
|---|---|---|---|
| 3,599,110 | 8/1971 | Gindi | 331/1 A |
| 3,614,635 | 10/1971 | LaPine et al. | 328/155 |
| 3,840,821 | 10/1974 | Conway | 331/25 X |

*Primary Examiner*—Siegfried H. Grimm
*Attorney, Agent, or Firm*—John M. Gunther

[57] ABSTRACT

In a feedback control system wherein data pulses also establish timing coordination between the data and the processing devices, two delay circuits are provided to extract the synchronized clock pulses from the coded incoming signal. This enables relative digital decoding and ensures a precise data transfer to a computer interface. One of the delay circuits enables a data reconditioner circuit to buffer the data and eliminates data peak shifting. The reconditioned data is provided to a coincident circuit which selectively transfers the data to a computer interface and to a phase difference detector. The other delay circuit provides to the phase difference detector a second input corresponding in time to the coded incoming data pulses. The detector's output generates a DC error voltage which synchronizes a voltage controlled oscillator (VCO). The outputs of the VCO are clock pulses in phase with the coded incoming signals. The feedback control system is capable of operating over a range of frequencies without effecting the margin for peak shifting.

10 Claims, 3 Drawing Figures

PHASE LOCK LOOP WITH DELAY CIRCUITS FOR RELATIVE DIGITAL DECODING OVER A RANGE OF FREQUENCIES

BACKGROUND OF THE INVENTION

1. Field of the Invention

This invention generally relates to computer systems and more specifically to apparatus for enabling the exchange of data to a computer interface from a peripheral device.

2. Description of the Prior Art

Digital computers generally operate in conjunction with external devices, called "peripherals" that feed input data into the computers and accept output data from them. Because peripherals may be electromechanical devices and the computers are electrical devices, the data as it is stored on each may be in a different form in order to ensure reliability for the data transfer. For example, peripheral devices having encoded NRZ data oftentimes miss interpretation since it is difficult to isolate the transition of binary ones and binary zeros without providing the time frame of reference. It has been found appropriate to use a data coding scheme in which the message contains clocking information so that reliability in the information retrieving process is ensured.

This combination of data with clocking information is called a self-clocking system. Two problems arise in magnetic recording system: (1) peak shifting or, as it is also known, phase jitter; and (2) recording frequency of the data. When data is stored on the peripheral it may be located at a place different from where it should be ideally located. This phenomenon is known as peak shifting or phase jitter and is an inherent property of the magnetic interaction. If the peak shifting becomes too great, the original data may actually be misinterpreted or lost.

In order to have proper transfer of data, it is required that the data pulses be precisely located on the peripheral devices not only to provide proper reading/writing of the data but also to eliminate the deskewing problems which occur when the data pulses are transmitted through delay lines in peripheral modules. Thus, the greater precision in locating and transferring the pulses, the lesser problems with reading and writing the data.

When data is stored or retrieved, it must be coordinated with timing pulses so that the appropriate time to sense the data is known. Thus, it is necessary that the data pulses be placed in the same slot as the timing pulses. This is known as clock synchronization. Depending on the speed of the device, the recording frequency of the data may be changed.

One prior art system as shown in U.S. Pat. No. 3,614,635 achieves time relocation for a fixed recording frequency by stretching the duration of the actual data pulses a fixed amount. These stretched data pulses are combined with phase difference pulses derived from the timing pulses to increment or decrement the frequency of a VCO. This system provides identical delay circuits to accentuate the difference between the clock pulses and the data pulses so that frequency changes to the provider of the clock pulses (oscillator) are rapidly implemented. Moreover, this system provides for relocation of the data, however, when the data is late it is relocated to the peak shifted time whereas in the case when the data is early it is relocated to the clock time. As a result, this system suffers from the disadvantage that precise timing for exchange of the data does not occur. This increases the deskewing problem.

The above system, like other previous systems, is also frequency dependent and is not able to be used over a range of frequencies. Thus, these systems hold the clock frequencies to a given value. If this frequency changes, the feedback control system does not work.

Finally, the above system is not able to be applied to various data rate schemes. For example, with Miller coded data it is necessary to determine whether the data transition occurs at a bit cell or bit boundary since this transition identifies whether the data is a binary one or a binary zero. This further increases the need for accurate correlation between time and data since slight variations may cause data misinterpretation.

OBJECTS OF THE INVENTION

It is therefore an object of the invention to overcome these prior art limitations.

It is a primary object of this invention to provide a feedback control system for a variable frequency oscillator which generates synchronized clock pulses to the coded data.

It is a further object of this invention to provide a feedback control system for a variable frequency oscillator which is self-correcting and which is adaptable to receive data at various frequencies.

It is another object of this invention to provide a feedback control system which allows the frequency of the data to vary without affecting the margin allowed for peak shifting.

It is yet a further object of this invention to provide a feedback control system which may be utilized with different forms of data.

SUMMARY OF THE INVENTION

The subject matter of this invention performs the above functions by providing a closed phase-lock-loop system which utilizes two symmetrical delay circuits to provide for relative digital decoding. Each data pulse is provided both to a first delay circuit and to a data reconditioner circuit which is responsive to a voltage controlled oscillator (VCO). The reconditioned data pulse is provided to a coincident circuit which has as its other input the output of the VCO. The output of the coincident circuit is provided both to a digital detector which changes the frequency of the VCO and also to a computer interface. Means are also provided for sensing the data at the bit cell and bit boundary so that proper interpretation of the data may occur.

BRIEF DESCRIPTION OF THE DRAWINGS

For a fuller understanding of the nature and objects of the invention, reference should be made to the following detailed description taken in conjunction with the accompanying drawings in which.

Detailed Description of the Preferred Embodiment

Reference will now be made to the apparatus shown in FIG. 1 together with the timing diagrams of FIG. 2a in which the first set of pulses shows the presynchronization (presync) condition for the reading of data from a peripheral device. In the preferred embodiment, the information will be located on a magnetic disc and a sector of the disc prior to the actual data will have a number of presync bits in order to enable the voltage controlled oscillator to become synchronized to the frequency of the data. These presync bits on the disc are equally spaced to assure proper VCO phase so that the data pulses in the read mode may be transferred to the apparatus of FIG. 1 with known transition polarity.

Figure 1:
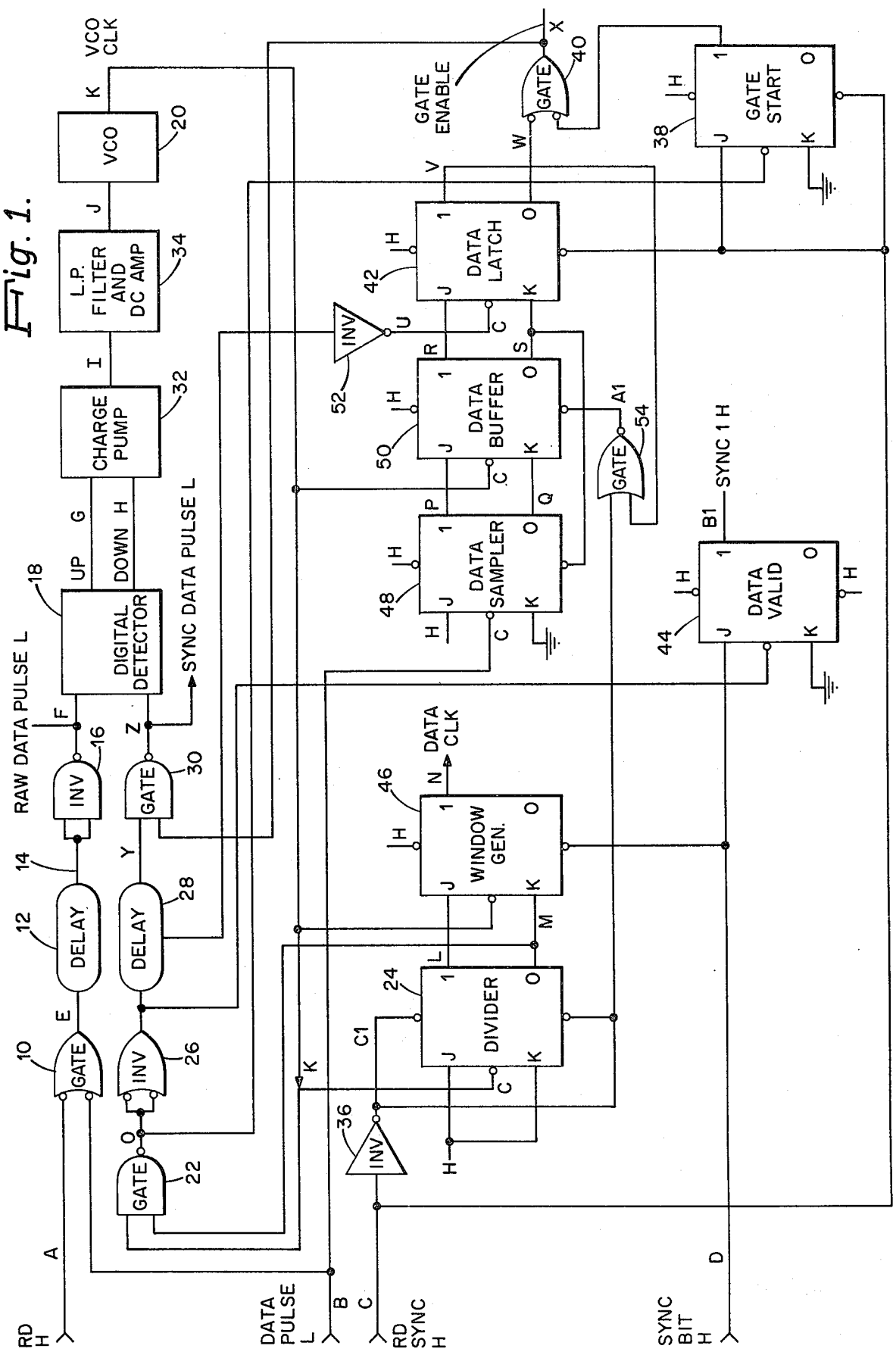
FIG. 1 is a simplified circuit schematic for a phase-lock-loop feedback control system for decoding data.
Figure 2A:
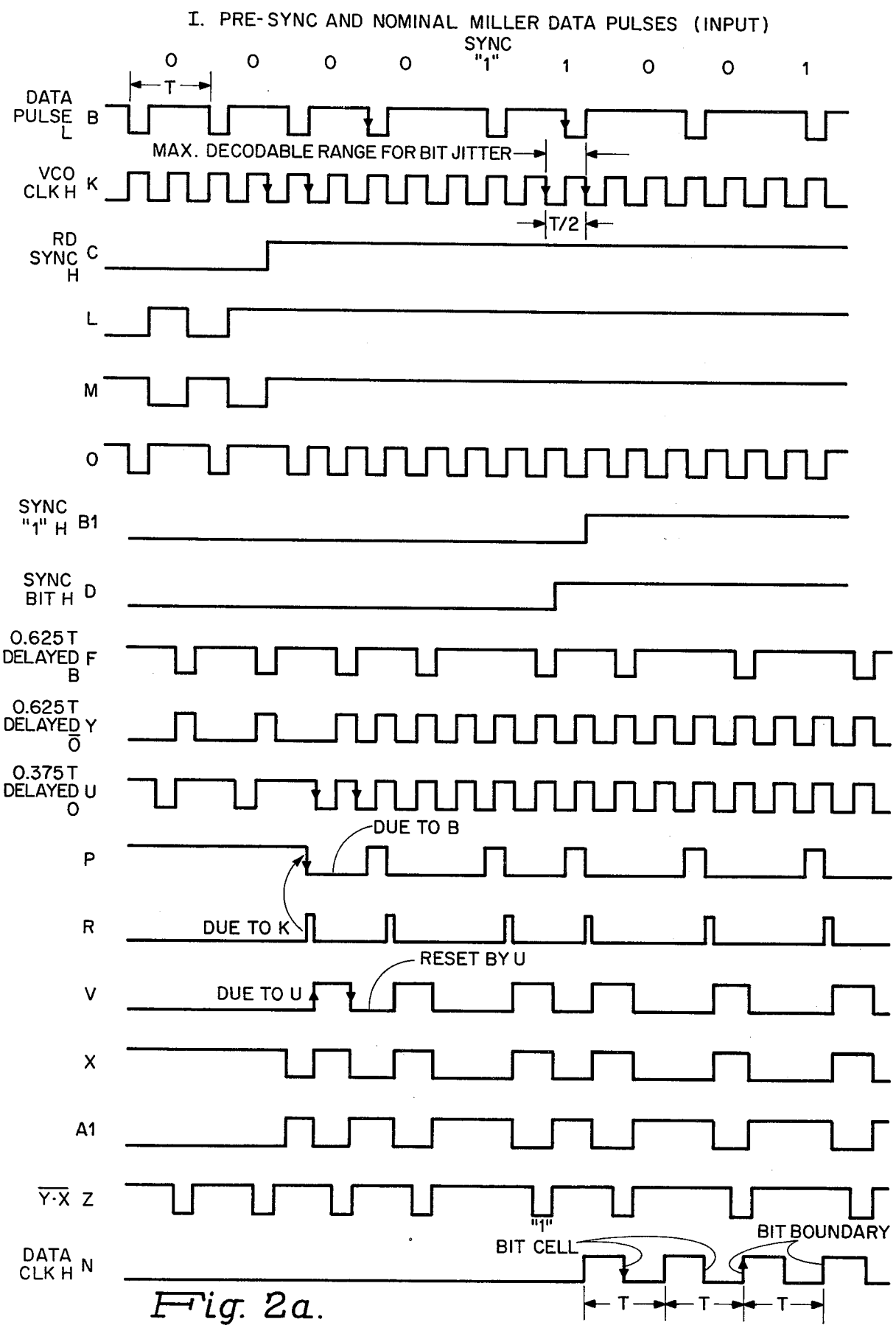
FIGS. 2a and 2b are a pulse timing diagram to be used in conjunction with the circuitry of FIG. 1.

More specifically, when looking at FIG. 1, the input data pulses from the disc are transferred over line B to one input of NOR gate 10. The other input to NOR gate 10 is the read command signal transferred over line A and is asserted high during data retrieving. Gate 10 inverts the incoming data at line E to delay element 12. Delay element 12, which is well known in the art, delays the data pulse from NOR gate 10 for a predetermined period of time. This delay period may be, for example, .625T wherein T is the period of frequency of the clock pulses. In a disk peripheral, T also establishes the minimum distance for retrieving a data pulse.

Each delayed data pulse signal is then transferred to an inverter 16 which then provides the data pulse over line F. This data pulse is equivalent to the data pulse L with .625T time delay and is provided to a phase difference detector or digital detector 18. As is shown in FIG. 2a the presync data pulses over line F occur once every period T.

The other input to the digital detector 18 for the presync data pulses is provided by the voltage controlled oscillator clock VCO 20. VCO 20 provides clock signals of a fixed frequency over line K. These clock signals are provided to NAND gate 22. The clock signals over line K are also provided to JK flip flop 24.

In the presync condition, the JK flop 24 takes each clock signal via its clock input (C) and on the trailing edge of each clock signal inverts its one and zero outputs. As a result, if line L was in a high state the trailing edge of the clock signals from the VCO would change the state of line L to low. Conversely, the zero output of JK flip flop 24 would then become high since lines L and M provide opposite signals.

The zero output of the JK flip flop 24 provides a second input to gate 22 via line M. In the presync condition, JK flip flop 24 acts as a divider of the clock signals from line K since it is only responsive to the trailing edge of the clock signal. JK flop 24 provides output clock signals over lines L and M. The clock signals over line M and over line K are combined by NAND gate 22 such that output signals of gate 22 are one-half the frequency of the K signals. Thus, when both input signals of gate 22 are high, gate 22 provides a low signal over line O, the frequency of the signals over line O being one cycle for every period T.

The output signals over line O are transferred to an inverter 26 and then to a delay element 28. Delay element 28 provides for two delays only one of which is needed in the presync state. This dalay over line Y is the same delay (625T) as provided by delay element 12. The delayed output over line y provides a first input to NAND gate 30. The second input to gate 30 in the presync condition is always a high signal, and as a result, the pulses from gate 22 are transferred to digital detector 18. Digital detector 18 is a standard TTL integrated circuit and may be a Motorola MC4044 series chip or equivalent as described in Section 11 of the Motorola Semiconductor Products, TTL Integrated Circuits Handbook, First Edition, May 1971.

Since each presync data pulse has been fixed, they are provided over line B to detector 18 once each period. Digital detector 18 compares these pulses to the clock signal from gate 30 on the leading edge. If these two edges to detector 18 are not in synchronization, then the frequency of VCO 20 is either incremented or decremented. By the end of the presync period, the output clock pulses from VCO 20 and the presync data pulses stored in the peripheral device are synchronized such that the leading edges of each occur at the same time.

The frequency correlation of VCO 20 to the data pulses is achieved by detector 18, charge pump 32 and DC amplifier 34. More specifically, if the data pulse over line F is early vis-a-vis the clock signal from line Z, digital detector 18 enables line G to be low for a duration equal to the time interval between the early pulse and the nominal clock position. Charge pump 32 is normally open when both lines G and H are high, or when lines F and Z are in perfect synchronization. In response to line G becoming low for a decisive interval, charge pump 32, which may be a current source, provides an incremental charge over line I to DC amplifier 34. DC amplifier 34 integrates the incremental charge and provides a higher voltage over line J to VCO 20. The positive voltage applied to VCO 20 causes it to increase its frequency so as to become synchronized with the data pulses provided over line F. Charge pump 32, low pass filter DC amplifier 32 and VCO 20 may be of conventional design.

Conversely, if the clock signals from line K as provided to digital detector 18 over line Z arrive before the data pulses over line F, then line H would provide a low signal for a duration of the late interval. In turn, charge pump 32 provides a decremental charge over line I to DC amplifier 32 decreasing the voltage provided over line J and slowing down VCO 20. With this continuous closed loop operation, the early and the late pulses will generate instantaneous up and down voltages, but the low pass filter averages out the net change. Consequently, VCO 20 operates at a frequency which corresponds to the average data pulse rate and provides a jitter free synchronized clock for subsequent data decoding.

In the preferred embodiment the actual data to be read is encoded as Miller data. As is well known, the reading of Miller data depends upon whether the data pulse occurs at a bit boundary or at a bit cell. Thus, Miller data has aa transition which may occur at a period T, 3/2T or 2T depending upon the encoded information.

With Miller data, a data pulse is provided at each transition. Since the transition occurs at a bit cell or bit boundary, the data pulse must be precisely detected to enable proper interpretation of the data. In the preferred embodiment, the maximum theoretical permissible bit shift is ± T/4 (.25T). Any data pulse which is peak shifted ± .25T or greater results in erroneously interpreted data.

Within a few presync bits prior to the reading of the actual data, a control signal is provided over line C. This is a read sync H signal which activates the proper polarity for the actual data pulses on flops 24 and 38. When the control signal goes from low to high, inverter 36 changes both the preset input (C1) and the clear input of JK flip flop 24 so as to bring both the L and M lines high. As a result, gate 22 becomes a pure inverter for the synchronized clock signals over line K which is twice the frequency than was previously done for the presync bits.

The read sync H signal over line C is also applied to a JK flip flop 38. This allows the signal from the one output of flags 38 to gate 40 to be switched to high at the trailing edge of the first clock signal from gate 22 over line O. Once this happens, the continuous high signal enables gate 40 to be responsive only to the output of the data reconditioner circuit over line W, which in turn is responsive to the data pulses. Previously, the JK flip flop 38 had provided a low input signal to gate 40 which enabled line X to always be high. By gate 40 being continually high, the equally spaced presync pulses on line Y were automatically transferred to detector 18. JK flip flop 38 functions as a starting mechanism for enabling the detection of data signals from the disk.

In conjunction with the activation of gate 40, the read sync H signal also enables the JK flip flop 42 which is part of the data reconditioner circuit. By flop 42 being enabled, line W changes depending on the data pulses received in the data reconditioner circuit.

It should be noted that all the presync bits were binary zeros. As a result, all the transitions were at the bit boundary. With the actual data, discrimination must be made to determine whether or not the data pulses occur at the bit cell or the bit boundary. This reference is provided by the window generator flop 46. The data clock signals over line N give continuous synchronized pulses at the data bit rate.

When the actual data is ready, a sync bit H control signal is provided over line D. This signal goes from low to high which in turn enables JK flip flop 44 to produce a sync one high output signal to the computer interface. This signal acknowledges the reading of the synchronized signals being transferred over lines Z and N. Upon receiving these two signals, they can easily be converted into standard NRZ pattern as is well known in the art, since a data pulse detected on the trailing edge of a clock signal indicates that the transition occurred at the bit cell, whereas, a data pulse detected on the rising edge of the clock signal indicates that the transition occurred at a bit boundary. The data pulses to be detected over line Z will now be explained.

Each data pulse from the peripheral is provided over line B and is applied concurrently to gate 10 and to a data sampler flip flop 48. The data pulse detected by gate 10 is transferred to delay element 12 where a .625T delay occurs. After this delay, the data pulse is transferred to digital detector 18.

JK flip flop 48 is set in response to the data pulse being provided to its clock input. In response to the data pulse, data sampler 48 provides a high signal over line P to the J input of data buffer flip flop 50 and a low signal over line Q to the K input. These signals enable flip flop 50 to also be responsive to its clock input. The clock input to flop 50 is tied to line K which is the VCO 20 output. After the J and K input signals have been received from data buffer 48, the trailing edge of the clock signal provided over line K enables flop 50 resulting in output signals to data latch flip flop 42.

As is apparent, data sampler 48 may be set for a variable period of time depending upon how early or late is the incoming signal on line B. Irrespective of this variable time period, data buffer 50 provides a signal only at a fixed time which is dependent upon VCO clock 20. Thus data buffer 50 ties the data pulse to the clock signals.

The data buffer 50, in response to the trailing edge of the clock signal over line K, provides a high signal over line R and a low signal over line S. Data sampler 48 has its clear input tied to line S. The low signal provided over line S resets data sampler 48 such that it is now able to be responsive to the next data pulse at its clock input over line B.

The high signal over line R and the low signal over line S also enable JK flip flop 42 to be responsive to its clock input over line U. This clock input is derived from the VCO clock signals provided over line K through a delay element 28 via inverter 52. The delay element provides a fixed delay which, for example, may be .375T. This delay eliminates set-up time and race condition when signals are transferred. The inverter inverts the clock signals so that the signals from the data latch 42 are centered vis-a-vis the signals provided over the other output of delay 28 on line Y. Inverter 52 ensures that the output signal from latch 42 via gate 40 to gate 30 is present before the delayed clock signal over line Y.

Flop 42 is latched at the trailing edge of the signal on line U. This latch lasts until one half a period later when the next trailing edge of the clock signal arrives resetting data latch 42. The time when the data is latched in flop 42, i.e., when flop 42 is set, provides a window via gate 40. This is a data valid window generated by the data reconditioner circuit, i.e., data sampler 48, data buffer 50 and data latch 42, which identifies the occurrence of an actual data pulse. The window is provided to gate 30 prior to the signal over line Y. When the signal is provided over line Y, gate 30 is enabled and a sync data pulse to the computer interface results. Since this signal is controlled by the VCO 20 clock signals, a fixed time relationship has been established which eliminates the effects of peak shifting and allows accurate decoding. Moreover, the deskewing problems which arise when the signal is peak shifted are eliminated since the data pulse is optimized to the clock signals at the transmitting end.

The data reconditioner circuit has taken the incoming nondelayed data pulse, i.e., the input to data sampler 48, phase locked this data pulse into the clocking system via data buffer 50 and generated a data valid window by data latch 42. The data valid window is synchronized to the phase locked clock signals and has removed any peak shifting which may have occurred to the incoming data pulse.

With the data latch 42 in a set condition, a high output signal over line V is provided to the NOR gate 54 which clears the data buffer 50 thereby resetting the data buffer so that it is responsive to the next data pulse received by data sampler 48. The other input to gate 54 is low during data retrieving and therefore is inactive.

The zero output of data latch 42 in a set condition provides a low signal over line W to NOR gate 40. This low signal enables gate 40 to provide the data valid signal over line X to gate 30. Since the output of gate 40 is a high signal which enables the NAND gate 30, this allows one of the delayed phase-locked clock signals to pass through onto line Z. This output signal corresponds to the data pulse reconfigured in time. Thus, gate 30 is a coincidence circuit whose output is a reconditioned data pulse free of peak shifting or phase jitter.

The data pulse over line Z is provided to digital detector 18 and to a computer interface. The combination of the data pulse from line Z and the clock signals over line N from window generator 46 may then be converted into other data forms, e.g. NRZ data and clock information. As is shown in FIG. 2a, when the data pulse over line Z occurs at the trailing edge of the clock signal over line N, then the transition has occurred at a bit cell. If the data pulse occurs on the rising edge of the clock signal over line N, then the transition has occurred at a bit boundary. By knowing when the transition has occurred, the decoding of the information into a binary ZERO or binary ONE is established.

With the input to the data buffer 50 tied to the trailing edges of the clock signals, the maximum decodable range for peak shifting is one half the time period, i.e., T/2. If the data pulse is shifted beyond ± T/4, or T/2, then a different data valid window occurs with the result that either the data is misinterpreted or it is not decodable.

Figure 2B:
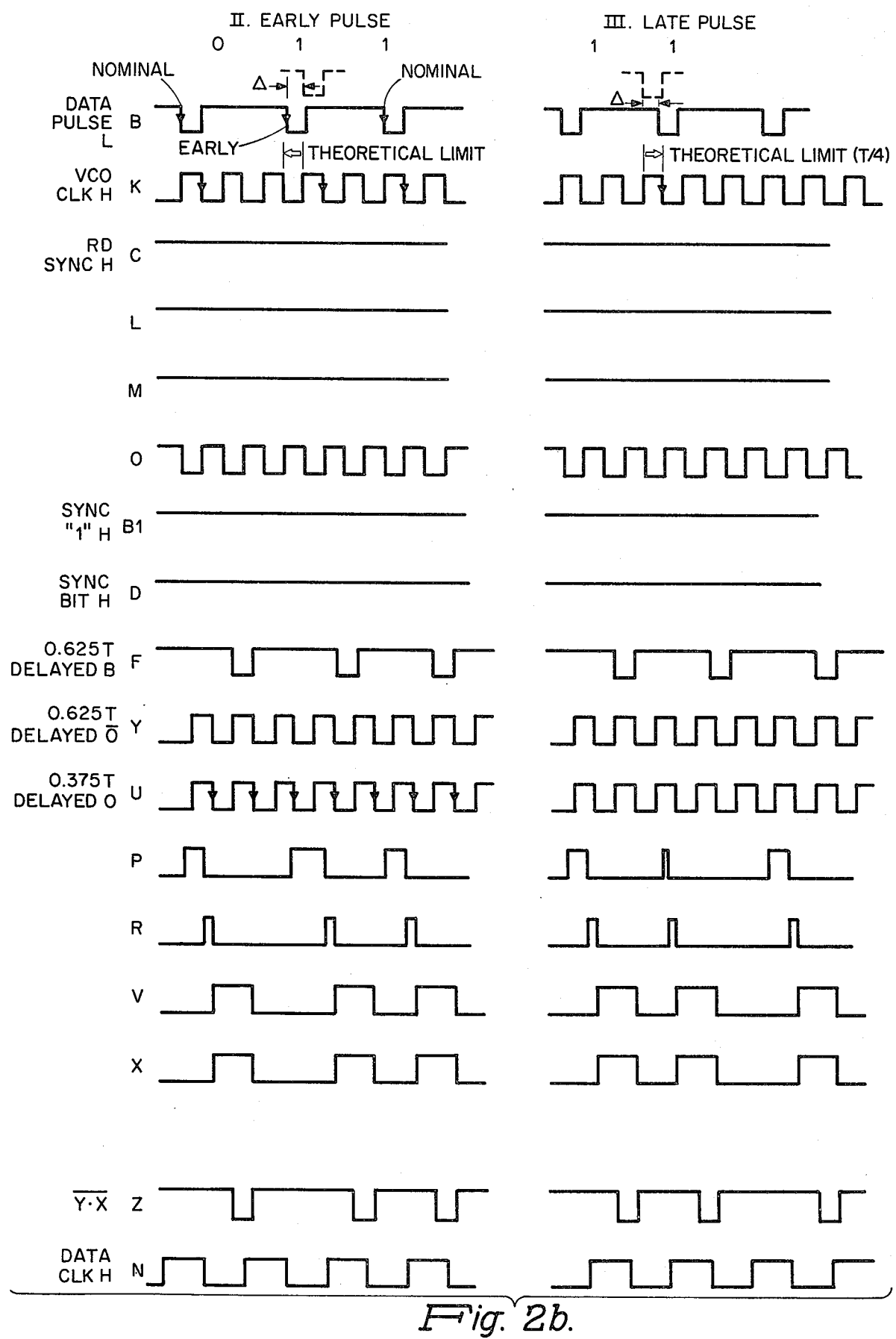

Referring to FIG. 2b and the timing diagram dealing with the early data pulses, the situation is now examined wherein the data pulse from the peripheral has been peak shifted so that it occurs earlier than it should have. As shown in FIG. 2b, the early pulse has been peak shifted by .2T, which is within the theoretical maximum peak shifting limit.

The early data pulse is provided to gate 10 and to data sampler 48. Once the data sampler 48 receives the data pulse, it provides a high signal over line P and a low signal over line Q thereby making data buffer 50 responsive to the clock signal over line K. Data buffer 50, however, will not be enabled until the trailing edge of the clock signal over line K is provided to its clock input. Since this occurs, T/4 plus .2T later, the data pulse is stored in data sampler 48 for a longer period of time. This is shown by the extended high signal provided over line P. As long as the data pulse provided to data sampler occurs before the previous trailing edge, the data will be properly transferred to the data latch 42 via data buffer 50. Moreover, since the data buffer 50 synchronizes the data pulse to the VCO clock signals over line K, the data pulse is reconfigured to a precise time.

For the situation involving late data pulses as shown in FIG. 2b, the example is taken where the data pulse is late by .2T. This late data pulse is provided to data sampler 48 which enables a high signal over line P and a low signal over line Q. At the trailing edge of the clock pulse over line K which occurs .05T later, the data pulse is transferred into data buffer 50 and then to the data latch 42. As a result, a short high signal over line P is realized since the late pulse is very close to the limits of the peak shift margin and is quickly reset by data buffer 50 when it gets transferred.

The feedback control system shown in FIG. 1 is also able to operate over a range of frequencies since only the delay in the delay elements are fixed. Moreover, the range of frequencies over which the feedback control system may operate does not affect the peak shift margin (T/4) described previously.

Once a nominal incoming data input rate from the peripheral has been determined, the delay provided by the delay elements is fixed. The VCO 20 signals will initially track to the incoming data rate. However, this rate may vary over a range of frequencies, the maximum and minimum range determined by the fixed delay time of the delay elements.

For the minimum input frequency, gate 30 requires a high signal to be present from line X prior to receiving a high signal from delay element 28 over line Y. This requirement is necessary since the data pulse over line Z to the computer interface is generated by the coincidence of these two signals. If the edge of the signal transferred over line Y were not enabling, the data pulse would be relocated later in time and the problems of deskewing, described previously, would be realized. Thus, gate 30 must receive a signal from the data reconditioner circuit over line X prior to receiving an input from delay element 28 over line Y.

In addition, data buffer 50 must be set up prior to the enabling signal from delay element 28 over line U enabling data latch 42. Since the period of the clock signals from VCO is twice the incoming data rate, the setting of the data buffer 50 and data latch 42 must be from the same clock signal. This forms the basis for limiting the range of frequencies able to be applied to the system. Stated differently, if a different clock signal enables data buffer 50 than the one which enables data latch 42, misinterpretation of the data results.

using the values disclosed in the preferred embodiment herein, it is seen that with delay elements 28 and 12 being based on the initial incoming data rate frequency, the frequency of system may be varied by ±50% with no system degradation. This has applicability, for instance, when using the system in the United States and Europe where the frequencies differ by 22%. Thus, the system can be initially set up for either location and if changed would have no degradation when operating in the other locations.

In viewing the above, data sampler 48 is responsive to the non-delayed data pulse whenever it occurs. The variations of the peak shifted data pulses are absorbed by the data sampler 48 and the data buffer 50, which only transfers the data pulse at a precise time to the data latch 42. In addition, the data valid signals from data latch 42 are only provided at a precise time over line X to gate 30. The output of data latch 42 has a constant duration which permits the data valid window to be for a fixed duration of time which is .5T.

Because the data reconditioner circuit ties the non-delayed data pulses to the clock signals, synchronization of both is always provided. The frequency of the clock signals is immaterial since the matched delay elements 12 and 28 provide relative digital decoding.

Since the feedback loop is operated on digital data, only the leading edges of the data pulses, independent of the pulse width, enable the switching of the digital elements in order to provide the outputs described.

Finally, by providing the reconditioned data pulses, a precise time for the data is provided to the computer interface. These data pulses have no jitter as shown by the output signals over line Z. However, the data with jitter which has been peak shifted is still preserved via the delay element 12 and results in the incrementing or decrementing of VCO 20.

While the invention has been particularly shown and described with reference to a preferred embodiment thereof, there will be understood by those skilled in the art that various changes in form and detail may be made therein without departing from the spirit and scope of the invention. Therefore, it is intended to only be limited by the following claims.

We claim:

1. In an apparatus for synchronizing clock signals and data pulses, the combination comprising:

A. a variable frequency oscillator for providing a continuous series of said clock signals;
B. first delay means responsive to said data pulses for providing a first predetermined delay;
C. second delay means responsive to said clock signals for providing a second and third predetermined delay;
D. means responsive to said second delay means for reconditioning said data pulses to said clock signals;
E. means for comparing the output of said reconditioning means with said first delay means; and
F. means responsive to said comparing means for varying the frequency of said variable frequency oscillator.

2. The combination as defined in claim 1 wherein said reconditioned data pulses are provided to a computer interface.

3. The combination as defined in claim 1 and further including:
A. means responsive to said clock signals for dividing said clock signals, said second delay means being responsive to said divider means such that said data pulses are interpretable as occurring within different clock periods.

4. The combination as defined in claim 1 wherein said reconditioning means includes:
A. first means for storing said data pulses, and second means responsive to the output of said first means for synchronizing said data pulses to said clock signals.

5. The combination as defined in claim 4 wherein said second means includes:
A. data buffer means responsive to the clock signals for storing said data pulses from said first means and for resetting said first means; and
B. data latch means responsive to said second delay means for storing said data pulses from said data buffer means and for resetting said data buffer means, said data latch means providing said reconditioned data pulses.

6. The combination as defined in claim 1 and further including:
A. means responsive to said clock signals and said second delay means for selectively transferring said reconditioned data pulses to said comparing means.

7. The combination as defined in claim 4 wherein said second means eliminates phase jitter.

8. An apparatus receiving data pulses from a device and providing to a computer interface data pulses at a fixed time, the apparatus being initially set to a nominal input data rate, a voltage controlled oscillator tracking said nominal input data rate, said apparatus comprising:
a. means for receiving said data pulses from said device;
B. means responsive to said receiving means for storing said data pulses for a predetermined period of time;
C. said voltage controlled oscillator initially providing continuous clock signals at said nominal data rate;
D. means responsive to said receiving means for reconfiguring said data pulses in accordance with said clock signals, said reconfiguring means eliminating the peak shifting of said incoming data pulses;
E. means responsive to said reconfiguring means and to said storing means for comparing said data pulses, said comparing means coupled to said voltage controlled oscillator for changing the frequency of said clock signals; and
F. wherein the rate of said incoming data may substantially change.

9. An apparatus as defined in claim 8 wherein said peak shifting of data pulses may occur within a range of $\pm T/4$ wherein T is the period of clock signals from the voltage controlled oscillator.

10. An apparatus as defined in claim 9 wherein the changing of said nominal data rate for incoming data pulses does not effect the peak shifting margin for said data pulses.

* * * * *